United States Patent [19]
Eslambolchi et al.

[11] Patent Number: 6,091,877
[45] Date of Patent: Jul. 18, 2000

[54] METALLIC BOND FOR DAMAGED FIBER OPTIC CABLE SHEATH

[75] Inventors: Hossein Eslambolchi, Basking Ridge, N.J.; John Sinclair Huffman, McDonough, Ga.

[73] Assignee: AT&T Corp, New York, N.Y.

[21] Appl. No.: 09/183,475

[22] Filed: Oct. 30, 1998

[51] Int. Cl.[7] .................................................. G02B 6/00
[52] U.S. Cl. ......................... 385/136; 385/134; 385/62; 385/81
[58] Field of Search ........................... 385/136, 134–139, 385/54, 55, 62, 81, 87

[56] References Cited

U.S. PATENT DOCUMENTS

| 5,082,338 | 1/1992 | Hodge ........................................ 385/81 |
| 5,408,562 | 4/1995 | Yoshizawa et al. ..................... 385/112 |
| 5,721,799 | 2/1998 | Fentress .................................... 385/77 |
| 5,949,947 | 9/1999 | Eslambolchi et al. .................. 385/134 |

*Primary Examiner*—Phan T. H. Palmer

[57] ABSTRACT

A repair arrangement for a fiber optic cable metallic sheath is formed of a pair of semi-cylindrical conductive tube sections (32,34) that mate to surround a section of cable (10) with damaged sheathing (12,14). Conductive clamps (36) are used to secure the attachment of the semi-cylindrical sections to the cable. The arrangement is relatively easy and quick to attach to the damaged cable and restores both the physical and electrical integrity to the cable.

11 Claims, 2 Drawing Sheets

METALLIC BOND FOR DAMAGED FIBER OPTIC CABLE SHEATH

BACKGROUND OF THE INVENTION

The present invention relates to a metallic bond for damaged fiber optic cable sheath and, more particularly, to a tubular, conductive housing for a damaged fiber section that restores both physical and electrical integrity to the damaged cable.

Fiber optic cable has become a standard transmission medium for many different communication systems. In general, a fiber optic cable consists of a number of separate optical fibers stranded together, and (usually) including a central metallic strength member to provide support to the set of optical fibers. Surrounding the fibers is a metallic sheath, used to provide outer mechanical support to the cable, as well as to provide an electric signal path that is used to send certain operational tones along the length of the cable. Plastic coatings may be then be used to cover the metallic sheath, particularly when the cable is to be buried in the ground.

A buried cable is vulnerable to many environmental hazards, such as lightning strikes and animal damage. A lightning strike may burn a hole through the metallic sheath, yet not immediately cause any harm to the encased optical fibers. Animal damage may be slow, eroding the integrity of the metallic sheath over a relatively long period of time. Regardless of the source of damage, the cable will eventually deteriorate and expose the bare fibers. As such, the fibers are then extremely vulnerable to any type of movement of the earth or the cable.

A need remains in fiber optic cable restoration for repairing a fiber optical metallic sheath immediately upon the occurrence of the initial damage to prevent the subsequent deterioration of the underlying cable.

SUMMARY OF THE INVENTION

The need remaining in the prior art is addressed in the present invention, which relates to a metallic bond for damaged fiber optic cable sheath and, more particularly, to a tubular, conductive housing for a damaged fiber section that restores both physical and electrical integrity to the damaged cable.

In accordance with the present invention, a pair of semi-cylindrical conductive members are disposed to surround the damaged cable section. One or more conductive clamps are used to securely hold the pair of conductive members in place. The utilization of a conductive material to form the semi-cylindrical members allows for the necessary electrical signals to be communicated through the damaged section of the sheath. Copper is a preferred material for both the semi-cylindrical members and the clamps. The tubular housing of the present invention may be used as either a temporary restorative measure (i.e., the clamps may be removed to remove the housing) or a permanent fix for damage such as a lightning burn.

Various advantages and features of the present invention will become apparent during the course of the following discussion and by reference to the accompanying drawings.

BRIEF DESCRIPTION OF THE DRAWINGS

Referring now to the drawings, where like numerals represent like parts in several views.

DETAILED DESCRIPTION

Figure 1:
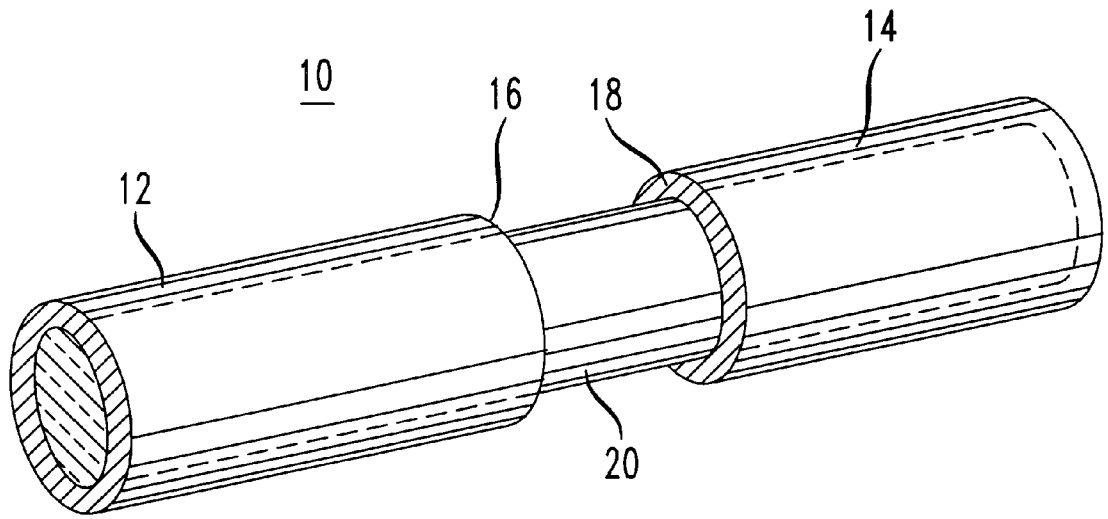
FIG. 1 illustrates an exemplary damaged fiber optic cable, with the metallic sheath removed in the damaged area.

FIG. 1 illustrates a portion of an exemplary fiber optic cable 10, where cable 10 has experienced damage to its outer metallic sheath. It is to be understood that the damage may have been a relatively small hole, or any other type of structural damage to the sheath. As shown, the sheath now comprises two sections, denoted 12 and 14, where sections 12 and 14 are both physically and electrically disconnected. That is, termination 16 of section 12 is separated from termination 18 of section 14 by a predetermined amount. In order to repair such damage, cable 10 is first processed to remove all of the metallic sheathing in the damaged area, using, for example, any appropriate etchant that will remove the metallic sheathing but not damage the underlying optical fibers. Underlying optical fibers 20 are now exposed in this region between the two metallic sheath sections.

Figure 2:
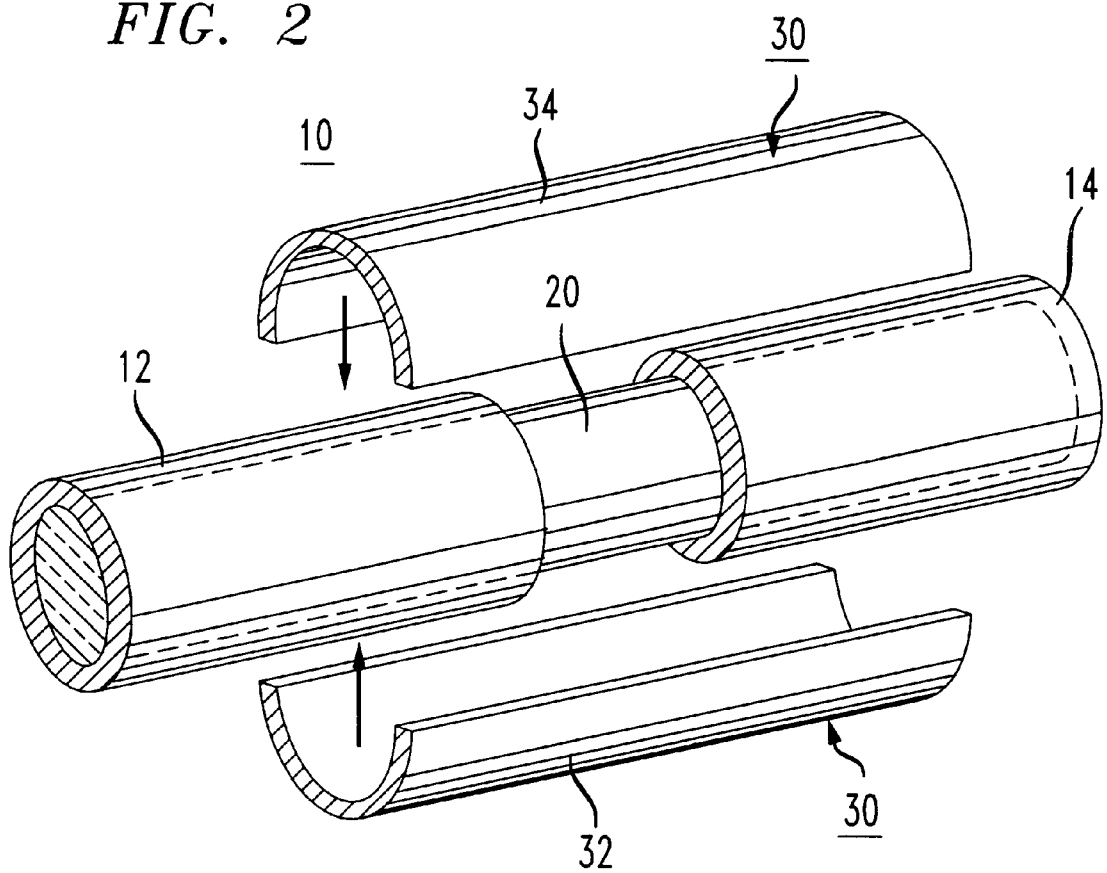
FIG. 2 is an isometric view of the fiber of FIG. 1, illustrating in particular the inclusion of the metallic restoration housing around the damaged cable section.

In accordance with the present invention, physical and electrical continuity is restored by placing a metallic sheath housing to surround the damaged section, as shown in FIG. 2. In particular, metallic sheath housing 30 of the present invention comprises a pair of semi-cylindrical members 32, 34 disposed to surround cable 10 and completely encapsulate exposed fibers 20. Accordingly, the length of housing 30 must extend beyond the damaged area. Once in place, electrical conductivity will be restored from metallic sheath section 12 to metallic sheath section 14 through housing 30.

Figure 3:
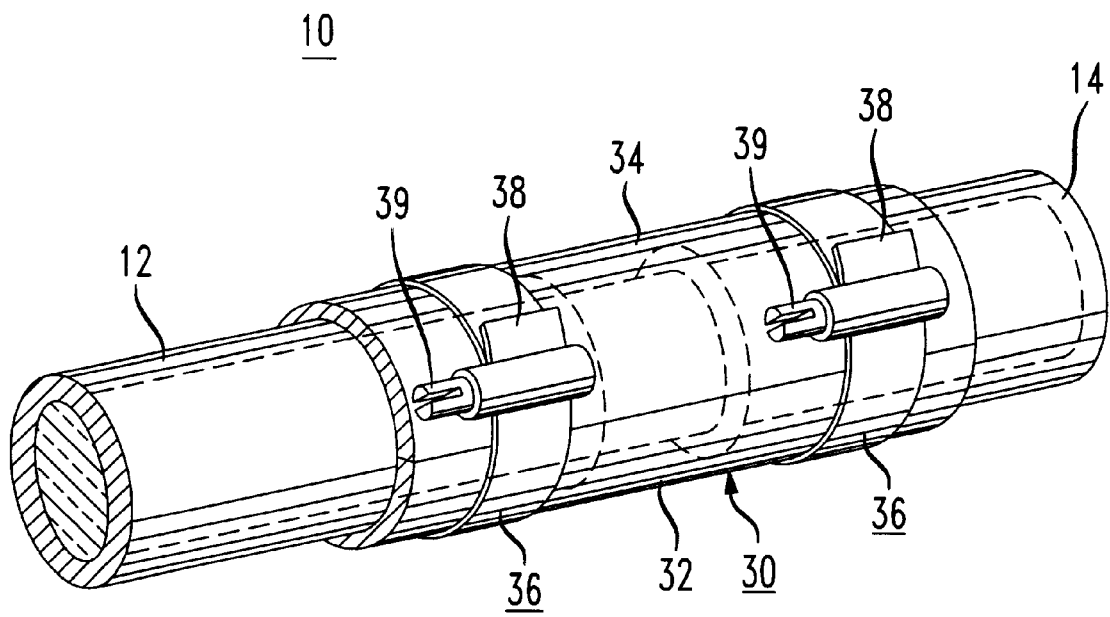
FIG. 3 is a side view of the arrangement of FIG. 2, with the inclusion of a pair of attachment clamps disposed to surround the metallic restoration housing.

Physical integrity in the damaged cable is restored by clamping housing 30 to cable 10, as shown in FIG. 3. One or more conductive clamps 36 are used to provide the physical attachment, where the clamps must be conductive to provide the necessary electrical path between sheath sections 12 and 14. In a preferred embodiment of the present invention, both housing 30 and clamps 36 may comprise copper. Clamps 36 may comprise conventional hose clamps that may be progressively tightened to provide the desired strength of physical attachment. It is to be understood that various conductive clamping arrangements may be used and all are considered to fall within the scope of the present invention. Referring to FIG. 3, each exemplary clamp 36 comprises a perforated metallic strip 38 disposed to surround housing 30 and a threaded tightening screw 39 to engage the perforations in strip 38. Tightening screw 39 functions to pull strip 38 until the enclosed cable portion is sufficiently taut. As mentioned above, housing 30 of the present invention may be used as a temporary sheathing repair and, therefore, easily removed merely by loosening screws 39 and removing strips 38. Once clamps 36 have been used to secure housing 30 to damaged cable 10, cable 10 may be placed in a conventional cable holder (not shown) and buried in the ground.

It is to be understood that the metallic sheath repair arrangement of the present invention may comprise conductive materials other than copper. Additionally, the pair of sections 32,34 used to form housing 30 need not be exactly semi-cylindrical, as long as when the pair are brought together a complete cylindrical housing is formed. That is, one section may comprise about two-thirds of a cylindrical tube and the other the remaining one-third. The only requirement of the arrangement of the present invention is that a conventional fiber optic cable must be able to be placed longitudinally within a section of the housing.

What is claimed is:

1. A fiber optical cable metallic sheath repair arrangement comprising a pair of conductive sectioned cylindrical members, each member sectioned along a longitudinal axis and disposed in contact with one another along a sectioned interface thereof, said pair of conductive sectioned cylindrical members for circumscribing a length of fiber optic cable with a damaged metallic sheathing; and at least one conductive clamp for maintaining physical contact between said pair of sectioned members and securing said members to the length of fiber optical cable enclosed therein.

2. A fiber optic cable metallic sheath repair arrangement as defined in claim 1 wherein the pair of conductive sectioned cylindrical members comprise copper tubing sections.

3. A fiber optic cable metallic sheath repair arrangement as defined in claim 1 wherein the at least one conductive clamp comprises a copper clamp.

4. A fiber optic cable metallic sheath repair arrangement as defined in claim 1 wherein the at least one conductive clamp comprises a plurality of conductive clamps.

5. A fiber optic cable metallic sheath repair arrangement as defined in claim 1 wherein each conductive sectioned member is essentially semi-cylindrical.

6. A fiber optic cable metallic sheath repair arrangement as defined in claim 1 wherein a first conductive sectioned member of said pair of members comprises a perimeter greater than the remaining member.

7. A fiber optic cable metallic sheath repair arrangement as defined in claim 1 wherein the at least one conductive clamp comprises:

a conductive strip disposed to surround the pair of sectioned members; and a tightening screw attached to said conductive strip for pulling said strip until the pair of sectioned members are sufficiently taut.

8. A fiber optic cable assembly including a plurality of separate optical fibers;

a metallic sheath disposed to surround said plurality of separate fibers, said sheath providing mechanical strength to said assembly and a communication path for electrical signals along the length of said assembly, said metallic sheath further including a damaged area where the sheath is missing and the plurality of optical fibers is exposed; and a metallic sheath repair housing comprising a pair of conductive sectioned cylindrical members, said members sectioned along the longitudinal axis of the cylinder and disposed to surround metallic sheath damaged area; and at least one conductive clamp for maintaining physical contact between said pair of sectioned members and securing said members to the fiber optic cable.

9. A fiber optic cable assembly as defined in claim 8 wherein the metallic sheath repair housing comprises a pair of copper sectioned cylindrical members.

10. A fiber optic cable assembly as defined in claim 8 wherein the at least one conductive clamp comprises a plurality of clamps.

11. A fiber optic cable assembly as defined in claim 8 wherein the at least one conductive clamp comprises a copper clamp.

* * * * *

UNITED STATES PATENT AND TRADEMARK OFFICE
CERTIFICATE OF CORRECTION

PATENT NO. : 6,091,877
DATED : July 18, 2000
INVENTOR(S) : Hossein Eslambolchi, et al It is certified that error appears in the above-identified patent and that said Letters Patent is hereby corrected as shown below:

Title page,
Item [75] Inventors should read as follows:
-- [75] Inventors: Hossein Eslambolchi, Basking Ridge, N.J.;
John Sinclair Huffman, McDonough,;
Ronald L. Sims, Conyers, both of Ga. --

Signed and Sealed this

Twenty-fifth Day of December, 2001

Attest:

Attesting Officer

JAMES E. ROGAN
*Director of the United States Patent and Trademark Office*